US 9,242,654 B2

(12) United States Patent
Do et al.

(10) Patent No.: US 9,242,654 B2
(45) Date of Patent: Jan. 26, 2016

(54) DETERMINING VEHICLE COLLISION RISK

(71) Applicant: International Business Machines Corporation, Armonk, NY (US)

(72) Inventors: Lydia M. Do, Raleigh, NC (US); Pamela A. Nesbitt, Ridgefield, CT (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/317,214

(22) Filed: Jun. 27, 2014

(65) Prior Publication Data

US 2015/0375756 A1    Dec. 31, 2015

(51) Int. Cl.
| | |
|---|---|
| B60W 50/14 | (2012.01) |
| G07C 5/08 | (2006.01) |
| G07C 5/00 | (2006.01) |
| B60W 40/09 | (2012.01) |
| G08B 25/00 | (2006.01) |

(52) U.S. Cl.
CPC .............. B60W 50/14 (2013.01); B60W 40/09 (2013.01); G07C 5/008 (2013.01); G07C 5/0841 (2013.01); B60W 2050/143 (2013.01); B60W 2540/30 (2013.01); B60W 2550/12 (2013.01); B60W 2550/20 (2013.01); B60W 2550/302 (2013.01)

(58) Field of Classification Search
CPC ...... G07C 5/008; G07C 5/0841; G08B 25/00; B60W 50/14; B60W 40/09
USPC .................. 701/70, 301, 96, 32.2, 32.3, 33.4; 340/540, 425.5
See application file for complete search history.

(56) References Cited

U.S. PATENT DOCUMENTS

| | | | |
|---|---|---|---|
| 5,270,708 A | 12/1993 | Kamishima | |
| 6,940,424 B2 | 9/2005 | Philiben et al. | |
| 7,145,441 B2 | 12/2006 | Knoop et al. | |
| 7,729,859 B2 | 6/2010 | Kimura et al. | |
| 2010/0007523 A1 | 1/2010 | Hatav | |
| 2010/0245064 A1* | 9/2010 | Fleishman et al. | 340/425.5 |
| 2010/0250045 A1* | 9/2010 | Miura et al. | 701/29 |
| 2011/0077028 A1 | 3/2011 | Wilkes, III et al. | |
| 2012/0271538 A1* | 10/2012 | Lee et al. | 701/117 |
| 2012/0330541 A1 | 12/2012 | Sakugawa et al. | |
| 2013/0124038 A1 | 5/2013 | Naboulsi | |
| 2013/0338914 A1* | 12/2013 | Weiss | 701/465 |
| 2014/0358326 A1* | 12/2014 | Phelan et al. | 701/1 |

FOREIGN PATENT DOCUMENTS

| | | |
|---|---|---|
| EP | 1429302 | 6/2004 |
| EP | 2148309 | 10/2013 |

OTHER PUBLICATIONS

Anonymous, "Accident Avoidance Through Risk Management," ip.com, IPCOM000224782D, Jan. 3, 2013, 5 pages.

* cited by examiner

*Primary Examiner* — Tan Q Nguyen
(74) *Attorney, Agent, or Firm* — VanLeeuwen & VanLeeuwen; David B. Woycechowsky

(57) ABSTRACT

An approach is provided for determining vehicle accident risk. The approach determines a current vehicle state of the vehicle during operation of the vehicle. The current vehicle state is based on one or more intra-vehicle factors and one or more extra-vehicle factors that pertaining to the vehicle. The current vehicle state is compared to a number of historic accident-related vehicle states that correspond to a vehicle accidents previously recorded for a number of vehicles. Based on the comparison, the process detects an accident risk that pertains to the vehicle. The driver of the vehicle is then notified of the detected accident risk.

20 Claims, 6 Drawing Sheets

DETERMINING VEHICLE COLLISION RISK

BACKGROUND OF THE INVENTION

The state of current technology addressing accident prevention identifies immediately impending collision situations. For example, vehicle cameras may detect potential collision obstacles in front of a vehicle or as a driver backs up. These systems may only detect obvious obstacles or situations unfolding around the vehicle. A multitude of criteria often contribute to an accident, some of which are not obvious and do not directly participate in the collision. While technology is being available and on the market to prevent accidents, a cursory view of newspapers and local television news broadcasts readily indicate that accidents are not being prevented at rates to have a statistical significance. Vehicle accidents are still a primary source of injury and death, especially among younger, more inexperienced, drivers.

SUMMARY

An approach is provided for determining vehicle accident risk. The approach determines a current vehicle state of the vehicle during operation of the vehicle. The current vehicle state is based on one or more intra-vehicle factors and one or more extra-vehicle factors that pertaining to the vehicle. The current vehicle state is compared to a number of historic accident-related vehicle states that correspond to a vehicle accidents previously recorded for a number of vehicles. Based on the comparison, the process detects an accident risk that pertains to the vehicle. The driver of the vehicle is then notified of the detected accident risk.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
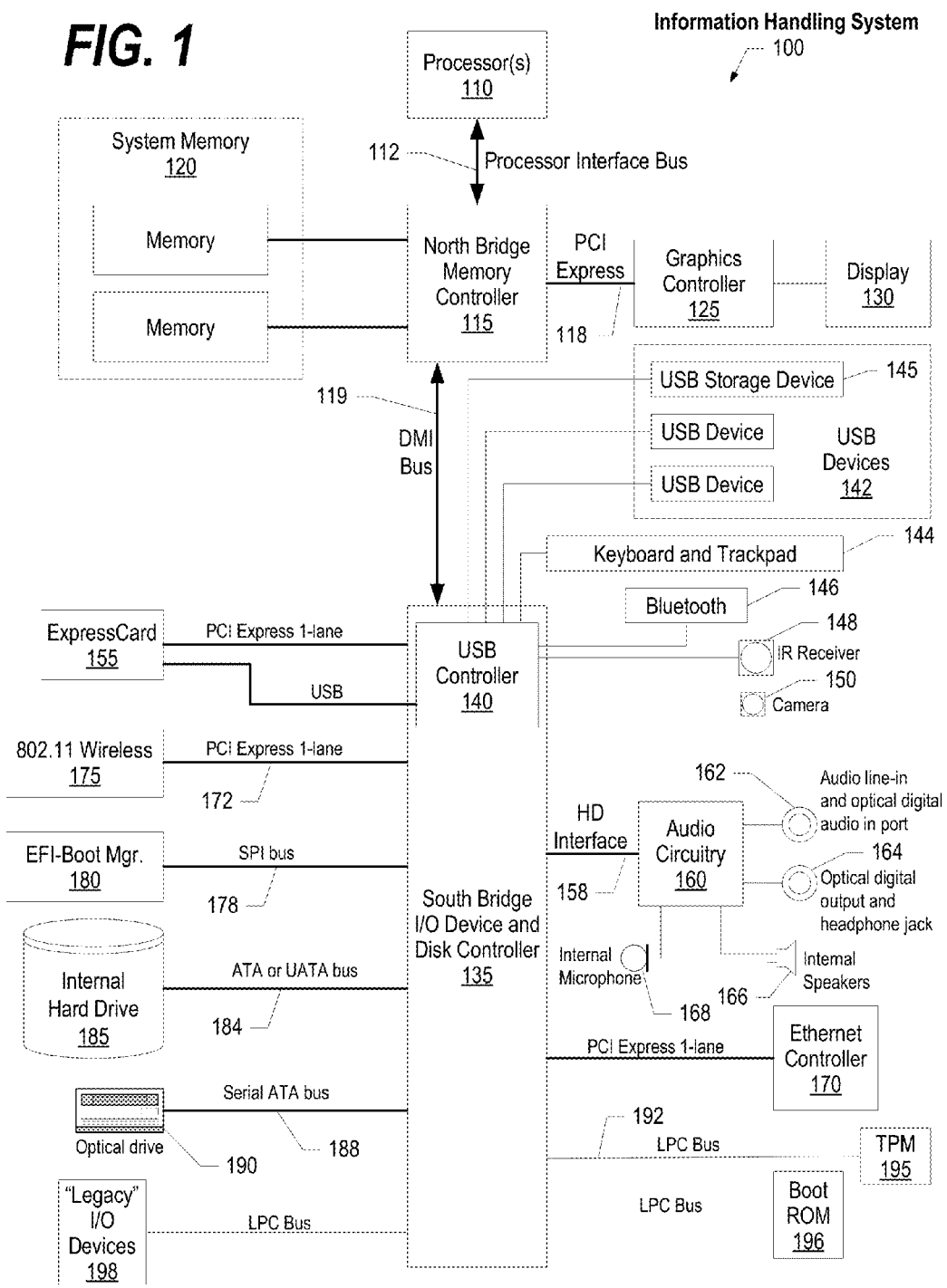
FIG. 1 depicts a block diagram of a processor and components of an information handling system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
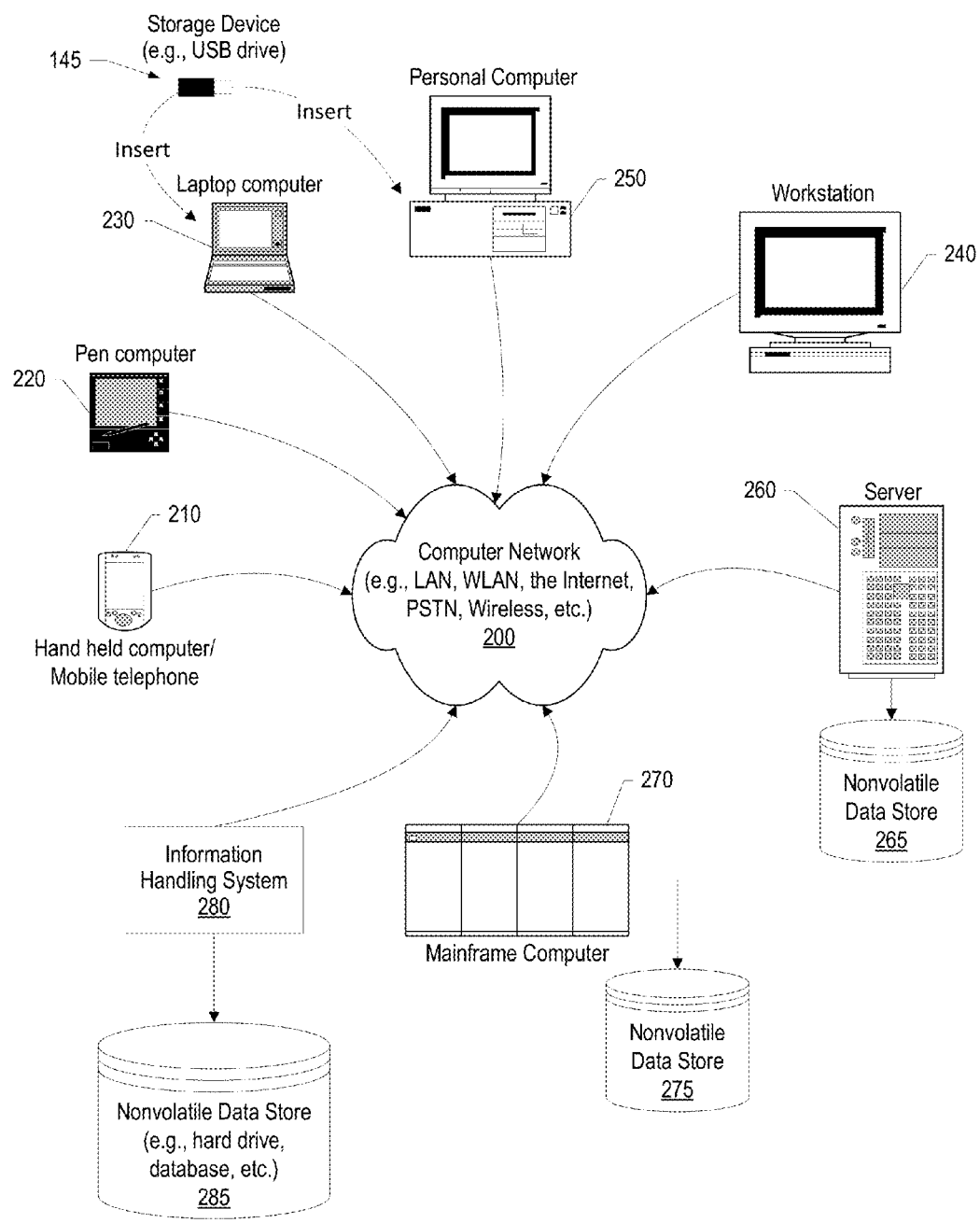
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-6 depict an approach that can be executed on an information handling system, to identify collision risks pertaining to a vehicle. This approach predicts whether a vehicle is, or will be, in a risky situation where the likelihood of having an accident is greater. The approach compares data pertaining to the vehicle with the data of past accidents as well as real-time data such as current weather conditions, current traffic and congestion conditions, the current time of day, current visibility due to darkness, the sun's position, etc. Analysis of vehicle data includes such factors as vehicle manufacturing/assembly, vehicle performance, physical operation of the vehicle, current environmental conditions, and historical data, such as dangerous sections of road, that may contribute to an accident. In one embodiment, while a driver is operating a vehicle, real-time, historical collision data is combined with intra- and extra-vehicular criteria to detect statistically high risk situations. By considering historical collision data together with real time situational data, the system is able to account for non-obvious collision factors that standard intra and extra vehicular sensors, geared to physically immediate collision potential, are not able to detect, such as historically problematic intersections, high risk of drunk drivers, sun position, etc.

Figure 3:
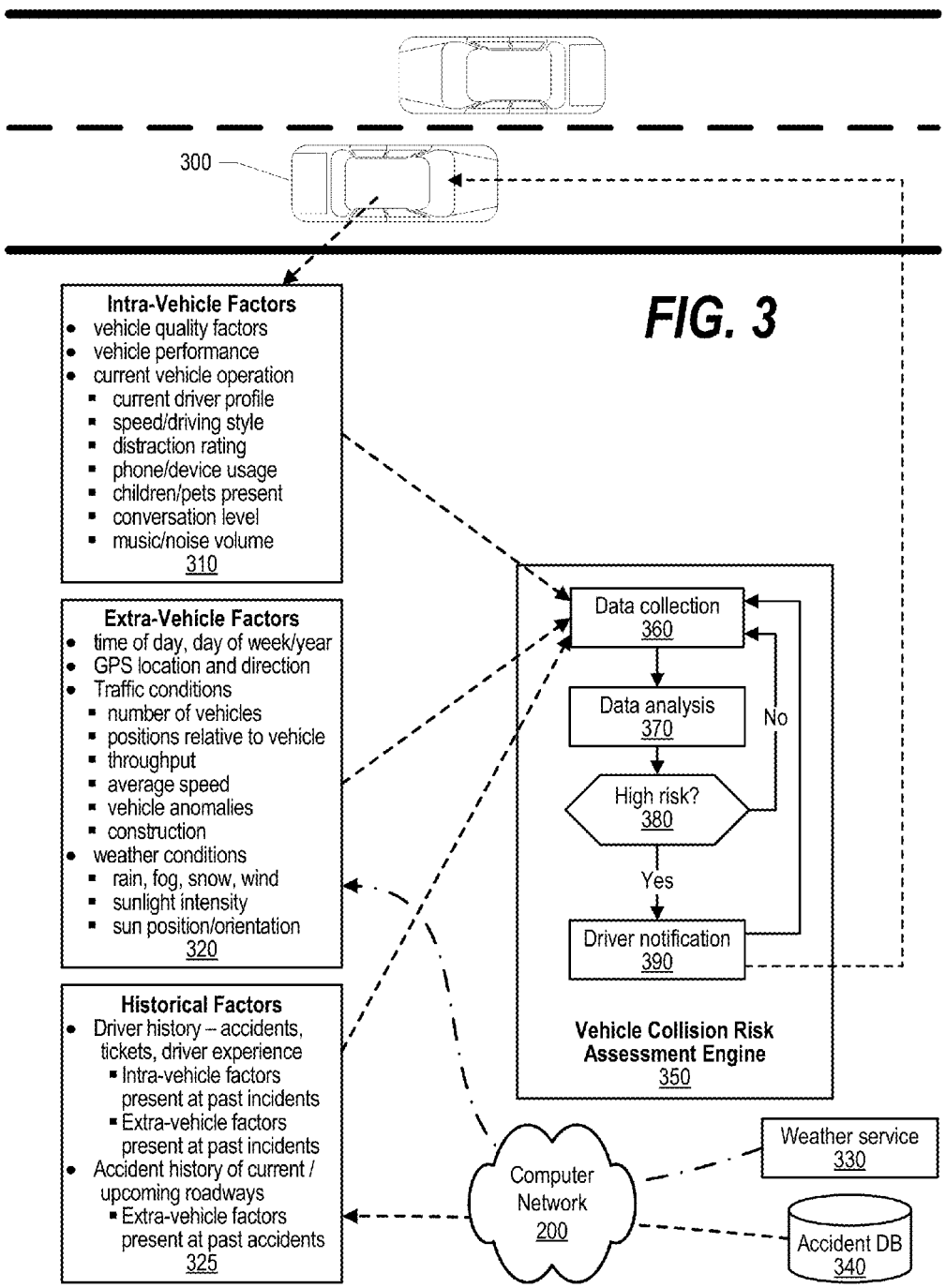
FIG. 3 is a component diagram depicting the various components in detecting vehicle collision risk for a given vehicle.

FIG. 3 is a component diagram depicting the various components in detecting vehicle collision risk for a given vehicle. FIG. 3 depicts vehicle 300 traveling on a roadway while, in the background, vehicle collision risk assessment engine 350 identifies possible collision risks pertaining to the vehicle.

Vehicle collision risk assessment engine 350 performs data collection step 360 to collect data pertaining to intra-vehicle factors 310, extra-vehicle factors 320, and historical factors 325. Some data is collected from external sources, while other data is collected by vehicle sensors. External sources includes sources such as weather service 330 that provides current weather conditions, and accident database 340 that is a data store of past accidents including accident location and other data regarding factors present at past accidents. Vehicle collision risk assessment engine 350 receives data from these external sources via computer network 200.

Examples of intra-vehicle factors 310 vehicle quality factors include the vehicle's performance data, and the vehicle's current operation data. The vehicle's current operation data includes data such as the current driver's profile, the current speed and driving style of the driver's operation of the vehicle, the driver's distraction rating, current phone or device usage by the driver, whether rambunctious children or pets are present in the vehicle, the conversation level in the vehicle, and the music or noise level (volume) currently found in the vehicle.

Extra-vehicle factors 320 include the time of day, and the day of week/year. For example, encountering another vehicle with an intoxicated driver are higher on Friday and Saturday nights or on certain holidays, such as New Year's Eve. Extra-vehicle factors also include the vehicle's GPS location and direction and current traffic conditions being encountered, and expected, for the vehicle given the vehicle's current location and direction of travel. For example, the vehicle might be heading towards a sharp traffic stoppage due to an accident or other condition where traffic is forced to rapidly decelerate. Current traffic condition data includes data such as the number of vehicles proximate to the vehicle, the positions of other vehicles relative to this vehicle, the throughput of traffic, the average speed of traffic, any vehicle anomalies such as a particular vehicle traveling far above or below the average speed of other vehicles, and road construction on the roadway or on a section of roadway that the vehicle is anticipated to encounter given the vehicle's current direction. Weather conditions include such factors as precipitation (rain, fog, snow, hail, freezing rain, etc.), wind, sunlight intensity, darkness level, the sun's current and orientation with respect to the vehicle (e.g., intense sunlight facing driver, etc.).

Historical factors 325 include the current driver's driving history such as accidents, tickets, and the driver's overall experience level. The driver history can also include Intra-vehicle factors that were present at past incidents (e.g., this driver has had accidents when talking on a mobile phone, etc.) as well as extra-vehicle factors present at past incidents (e.g., this driver has had previous accidents in rainstorms or on a particular day/time such as on Fridays after work, etc.). Historical factors also include the accident history of the current and upcoming roadways. For example, a stretch of particularly dangerous road that this driver has never before encountered. In addition, the accident history of roadways can also include the extra-vehicle factors present at past accidents. For example, a particular intersection has been prone to many accidents due to other drivers running red lights and this has occurred more frequently at a particular time of day, such as during morning rush hour when some drivers have been running late to work.

Vehicle Collision Risk Assessment Engine 350 next performs data collection, step 370, using the data collected at step 360. Data analysis 370 not only looks at individual factors that might contribute to an accident, but also combines multiple factors to identify risks inherent when multiple factors are present. The Vehicle Collision Risk Assessment Engine determines, based on the analysis, whether a high risk of an impending accident is present (decision 380). If a high risk situation is detected, then decision 380 branches to the "yes" branch whereupon, at step 390, the process notifies the driver (e.g., audible alert, visible display on dashboard display, etc.). On the other hand, if a high risk is not detected, then decision 380 branches to the "no" branch bypassing step 390. Processing continues to loop to collect and analyze additional data so that the driver can be notified of any high risk conditions.

Figure 4:
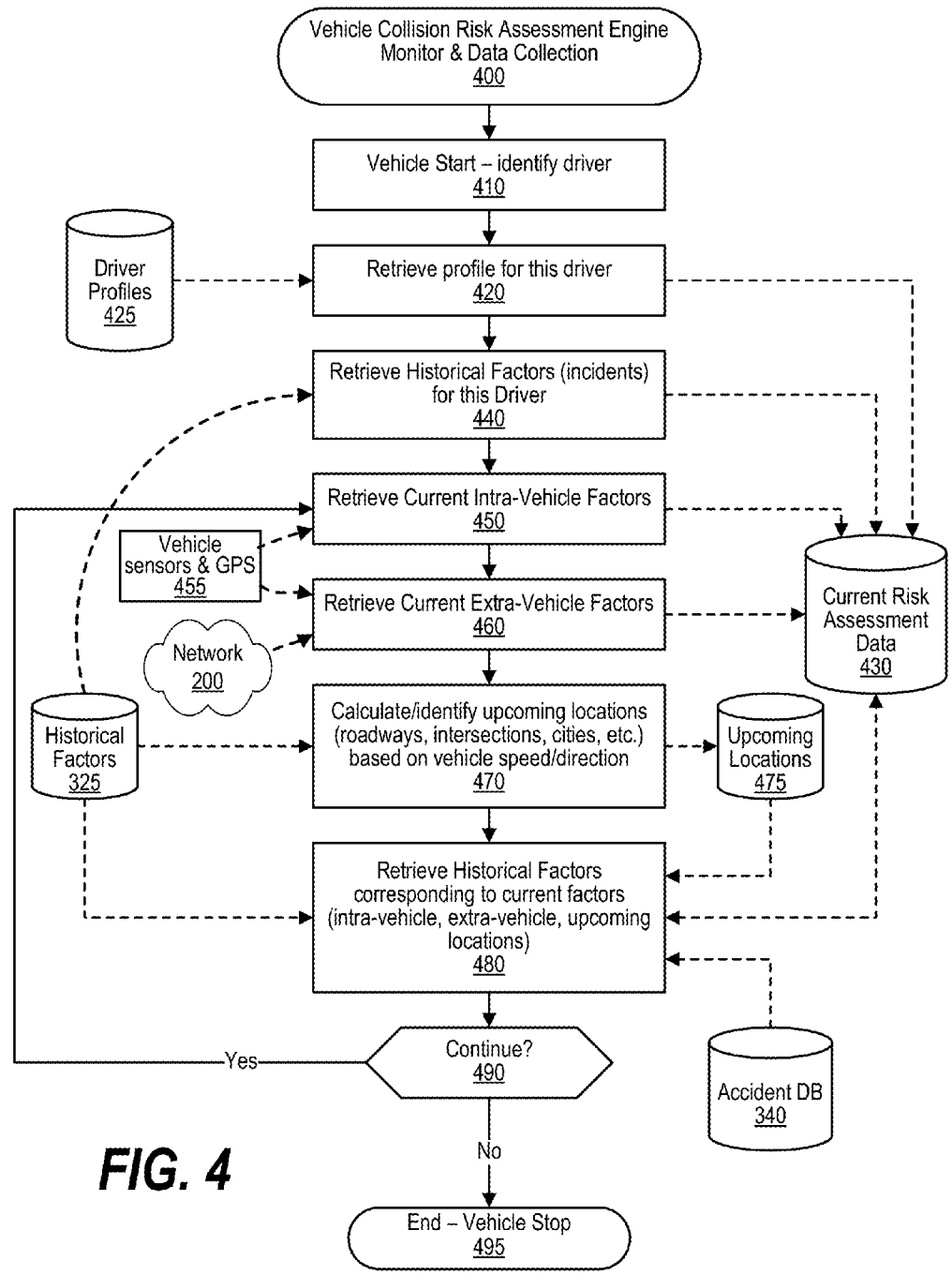
FIG. 4 is a depiction of a flowchart showing the logic performed by a vehicle collision risk assessment engine that collects collision related data and monitors a vehicle environment.

FIG. 4 is a depiction of a flowchart showing the logic performed by a vehicle collision risk assessment engine that collects collision related data and monitors a vehicle environment. Processing commences at 400 whereupon, at step 410, the process identifies the current driver of the vehicle when the vehicle is started. Various techniques can be used to identify the driver, such as biometric inputs, facial recognition, voice recognition, and the like. At step 420, the process retrieves the driver profile pertaining to the current driver from data store 425. The current driver profile data (e.g., experience level, physical impairments, etc.) is stored in current risk assessment data store 430. At step 440, the process retrieves historical factors (e.g., driving incidents, accidents, etc.) that pertain to the current driver of the vehicle. These retrieved historical factors are also added to current risk assessment data store 430.

A loop is started at step 450. At step 450, the process retrieves current intra-vehicle factors such as intra-vehicle factors 310 previously shown and described with respect to FIG. 3. Intra-vehicle factors are collected from array of sensors 455 included in the vehicle. These sensors include audio microphone sensors that detect noise levels in the vehicle and distinguish between different types of noise sources based upon the quality of the noise source as well as the location of the noise source. For example, noise sources emanating from the backseat may be attributed to children and/or pets, while conversational tone and levels detected from the driver may be used to determine whether the driver is talking on a mobile telephone or with other people detected as being present in the vehicle. Motion detectors (sensors) in the interior of the vehicle are used to detect movement of the driver and passengers, such as whether the driver is distracted and attempting to do other activities, such as eating, while driving the car. The movement of passengers, such as rambunctious children, may also be detected and add to the potential distractibility of the driver. Vehicle sensors such as speed sensors, brake sensors, and tire sensors, are used to determine vehicle quality and performance factors as well as the driver's current speed and driving style (e.g., aggressively speeding up and stopping quickly rather than composed gradual accelerations and stops, etc.). The current intra-vehicle factors are added to current risk assessment data store 430.

At step 460, the process retrieves current extra-vehicle factors such as extra-vehicle factors 320 previously shown and described with respect to FIG. 3. Some external risk factors are collected from vehicle-based sensors 455, while others are collected from external sources via a wireless network link to computer network 200, such as the Internet. The vehicle-based sensors, such as motion and proximity sensors, are used to identify the number of vehicles that are proximate to this vehicle, the positions of the other vehicles in relation to this vehicle, the average speed of the other vehicles (used with a comparison to this vehicle's speedometer reading), and road conditions, such as construction, potholes, or rough road conditions. In addition, vehicle anomalies, such as vehicles traveling much faster or much slower than this vehicle, can be identified and included as extra-vehicle risk factors (e.g., warn of vehicle ahead that is traveling much slower than this vehicle, warn of fast upcoming vehicle approaching rear of this vehicle, etc.). External vehicle sensors can also detect sunlight, or darkness, intensity, and the sun's position and orientation with respect to this vehicle. Precipitation and temperature sensors are used to detect current precipitation (rain, snow, etc.) as well as the current temperature in order to provide any relevant precipitation-related risk factors, such as likely or possible freezing rain. A Global Positioning System (GPS) device included with the vehicle provides the vehicle's current position and direction of travel. A digital roadmap data store accessible by the GPS is used to identify the current roadway identifier as well as upcoming intersections and roadways. If a route has been programmed into the GPS by the driver, the route information is used by the system to look ahead at roads that the vehicle is expected to traverse and provide any risk factors that are anticipated based on the expected route. An on-board clock can provide the current time of day and day of week. Network-based data can supply data gathered from other vehicles as well as data gathered and made available by government or private organizations. This network-based data might include construction zones either officially reported on a Department of Transportation (DoT) website, as well as unofficial construction zones detected by other vehicles that recently traveled through such areas. The network-based data might also include traffic information officially and unofficially gathered, such as by DoT controlled traffic sensors as well as traffic as detected by vehicles that recently passed through the area. The current extra-vehicle factors are added to current risk assessment data store 430.

At step 470, the process calculates and identifies upcoming locations (e.g., roadways, intersections, cities, etc.) that the vehicle is likely to encounter based on the vehicle's current speed and direction of travel (e.g., 50 MPH traveling north on highway 21, etc.). The upcoming locations identified at step 470 are stored in data store 475. In addition, as previously mentioned, the driver may have programmed the GPS with the driver's intended destination and the GPS is providing route guidance. Such route guidance can be used to identify upcoming locations. Furthermore, if the route being taken by the driver is a routinely taken route, such as the drive to work, church, school, etc., the GPS sensor can detect that the route is a routine, or historical, route taken by the driver and the upcoming locations that are anticipated can be derived from the historical route information (e.g., where the driver is likely to turn, other roadways that the driver is likely to use, etc.). At step 480, the process retrieves historical factors corresponding to the current factors of the vehicle (e.g., intra-vehicle factors, extra-vehicle factors, upcoming locations, etc.). Historical factors includes historical factors 330 previously shown and described with respect to FIG. 3 and also includes historical accident data retrieved from accident database 340. The retrieved historical factors are added to current risk assessment data store 430.

The process determines as to whether to continue the process and keep collecting data or stop (decision 490). If the vehicle is not stopped, then decision 490 branches to the "yes" branch which loops back to step 450 to continue collecting current risk assessment data. This looping continues until the vehicle is stopped (e.g., powered off, etc.), at which point decision 490 branches to the "no" branch and processing ends at 495.

Figure 5:
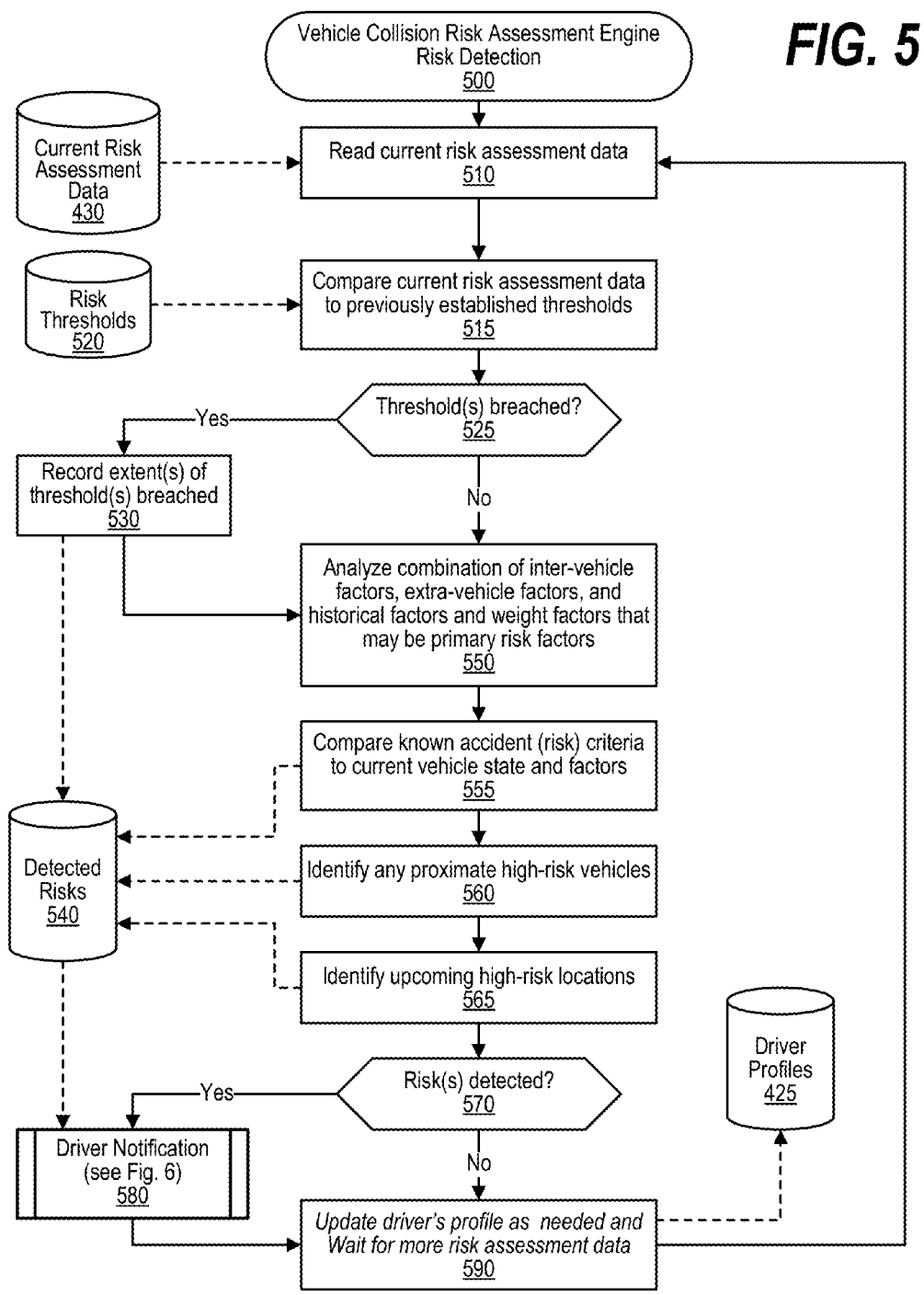
FIG. 5 is a depiction of a flowchart showing the logic performed by a vehicle collision risk assessment engine that detects risks based on the collected collision related data.

FIG. 5 is a depiction of a flowchart showing the logic performed by a vehicle collision risk assessment engine that detects risks based on the collected collision related data. Processing commences at 500 whereupon, at step 510, the process reads the current risk assessment data from data store 430 with the current risk assessment data being gathered by the process previously shown and described in FIG. 4. At step 515, the process compares the current risk assessment data to previously established thresholds, with the risk thresholds being retrieved from data store 520.

The process determines as to whether any thresholds pertaining to the collected risk assessment data have been breached (decision 525). Thresholds may be independently set for various risk factors, or may be broadly set. In addition, default thresholds may be used for some risk factors, while the user may wish to configure other risk factors based on the particular risk factors involved. Historical data, such as accident conditions found during official investigations of accidents, may be used to provide standard, or default thresholds. A threshold could be set as a probability increase of an accident occurring under the conditions found in the intra-vehicle factors, extra-vehicle factors, and historical factors. A default threshold could be set to trigger an alert when the probability of an accident occurring, given the factors, is five times the normal probability of an accident occurring. For example, if the collective set of factors show that the stretch of roadway has ten times as many accidents occurring, then the threshold would be breached. As another example, if the distractions identified in the vehicle, such as noise levels, mobile phone usage, and current driver inexperience are detected, this set of factors, when combined, may have been shown to increase the risk of an accident by twenty times over when such factors are not present. If any thresholds have been breached, then decision 525 branches to the "yes" branch whereupon, at step 530, the process records the extents of the one or more thresholds that have been breached. Using the examples from above, the dangerous roadway risk is twice the threshold level (10 times (10×) increase versus a 5× threshold) and the distraction level is quadruple the threshold level (20× increase in risk versus the 5× threshold). The breaches and extents of the breaches are stored in data store 540. Returning to decision 525, if no thresholds have been breached, then decision 525 branches to the "no" branch bypassing step 530.

At step 550, the process analyzes any number of combinations of inter-vehicle factors, extra-vehicle factors, and historical factors. Factors that may be primary risk factors are weighed more heavily than other factors. At step 555, the process compares known accident, or risk, criteria to the current vehicle state and inter- and extra-vehicle factors. At step 560, the process identifies any proximate high-risk vehicles, such as nearby vehicles driving erratically, at a much higher or lower speed than other vehicles, and the like. At step 565, the process identifies any upcoming high-risk locations that the vehicle is likely to encounter, such as an upcoming dangerous intersection or stretch of roadway.

The process determines as to whether any high risks have been detected (decision 570). If high risks have been detected, then decision 570 branches to the "yes" branch whereupon, at predefined process 580, the process performs a driver notification process to notify the driver of the risky conditions (see FIG. 6 and corresponding text for further processing details). On the other hand, if risks are not currently detected, then decision 570 branches to the "no" branch bypassing predefined process 580.

At step 590, the process updates the current driver's profile (as needed) which is stored in data store 425. In one embodiment, the driver profile is rather dynamic instead of a more static profile. In this embodiment, the process captures the driver's current driving behavior and actions and stores them in the driver's profile. This driver and behavior data can provide further input to the risk analysis engine to determine if a high collision risk is detected for the vehicle. After any profile updates are performed, the process waits for additional risk assessment data to be gathered by the process shown in FIG. 4. When additional risk assessment data has been gathered, the process loops back to step 510 to repeat the risk detection steps described above.

Figure 6:
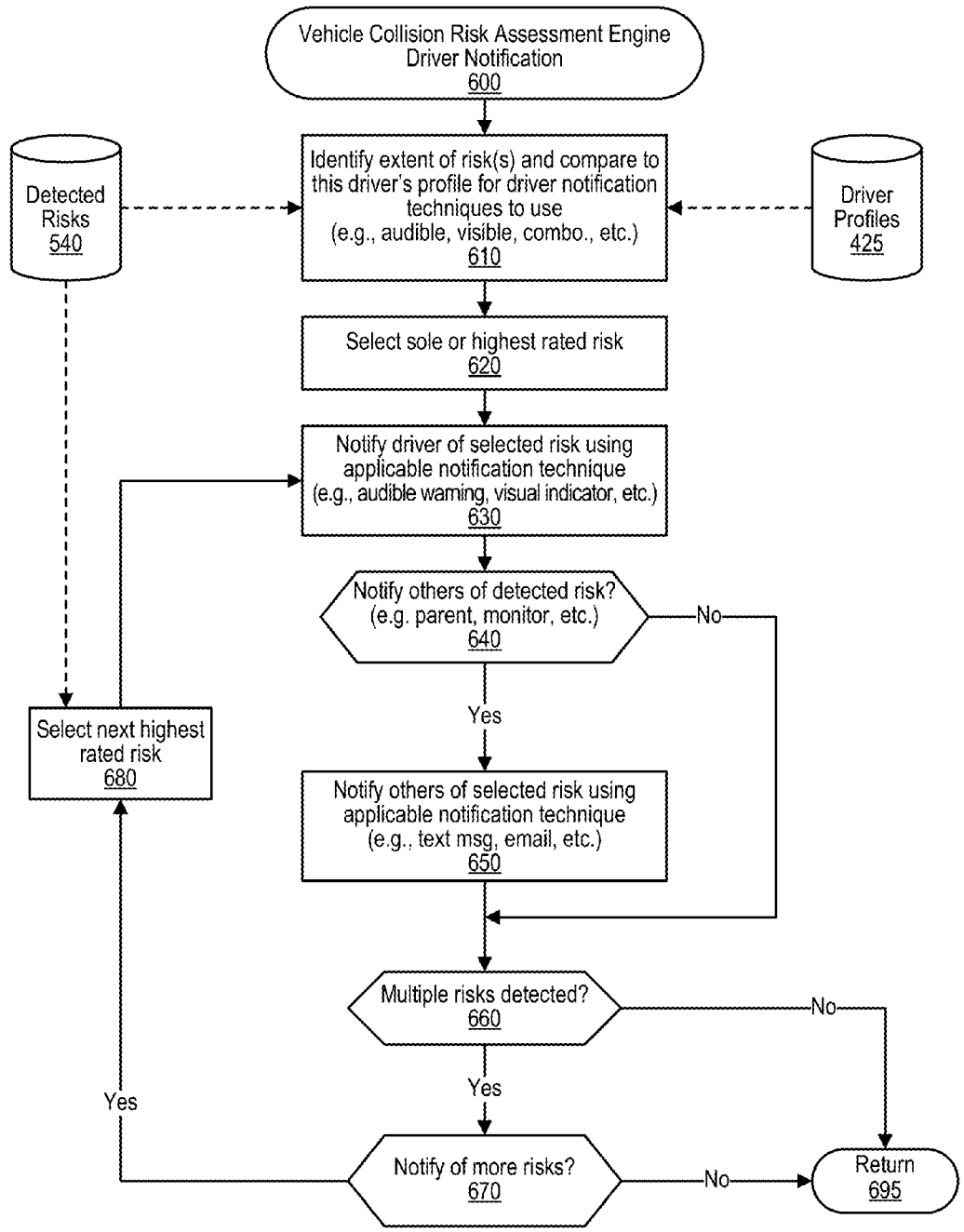
FIG. 6 is a depiction of a flowchart showing the logic performed by a vehicle collision risk assessment engine that notifies a driver of the vehicle of identified collision risks.

FIG. 6 is a depiction of a flowchart showing the logic performed by a vehicle collision risk assessment engine that notifies a driver of the vehicle of identified collision risks. The driver notification process commences at 600 whereupon, at step 610, the process identifies the extent of the one or more risks detected and stored in data store 540 by the process shown in FIG. 5. The process compares the detected risks to this driver's profile, retrieved from data store 425, for driver notification techniques to use for this driver (e.g., audible, visible, combo., etc.).

At step 620, the process selects the sole or highest rated risk. At step 630, the process notifies the driver of the selected risk using the applicable notification technique (e.g., audible warning, visual indicator, etc.). The process determines as to whether to notify other people of the detected risk, such as a parent, a guardian, law enforcement, or other monitor such as an employer of the vehicle driver (decision 640). For example, if the detected risk is found to be exceedingly high, such as detection of a reckless or impaired driver in one of the vehicles, then the process can notify law enforcement so that preventative measures can be taken to address the identified risk. If other people should be notified of the detected risk, then decision 640 branches to the "yes" branch whereupon, at step 650, the process notifies others of the selected risk using an applicable notification technique (e.g., a text message, an email, etc.). On the other hand, if no other people should be notified, then decision 640 branches to the "no" branch bypassing step 650.

The process determines as to whether multiple risks have been detected (decision 660). If multiple risks have been detected, then decision 660 branches to the "yes" branch whereupon the process determines as to whether to notify the driver of other detected risks (decision 670). For example, to prevent distracting the driver, the system may be set to alert the driver to only the highest one or two detected risk, or a more experienced driver with less likelihood of becoming distracted, may choose to be notified of all detected risks. If the driver should be notified of additional detected risks, then decision 670 branches to the "yes" branch whereupon, at step 680, the next highest rated risk is selected from data store 540 and process loops back to notify the driver, and others if applicable, of the detected risk. When the driver should not be notified of additional risks, or there are no more detected risks, then decision 670 branches to the "no" branch. Likewise, if multiple risks were not detected, then decision 660 branches to the "no" branch. Processing then returns to the calling routine (see FIG. 5) at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of determining vehicle accident risk, the method comprising:
   during operation of a selected vehicle, determining a current vehicle state of the selected vehicle, wherein the current vehicle state is based on a predicted upcoming geographic location of the selected vehicle;
   comparing the current vehicle state to a plurality of historic accident-related vehicle states that correspond to a plurality of vehicle accidents previously recorded for a plurality of vehicles;
   detecting an accident risk pertaining to the selected vehicle based on the comparison;
   determining whether the detected accident risk reaches a threshold, wherein the threshold is based on a current driver profile corresponding to a driver of the selected vehicle; and
   notifying the driver of the selected vehicle of the detected accident risk based upon the determination.

2. The method of claim 1 further comprising:
   identifying the predicted upcoming geographic location of the selected vehicle based on a current speed and a current direction of the selected vehicle;
   identifying an accident occurrence value pertaining to the identified predicted upcoming geographic location by retrieving one or more accident records from the plurality of vehicle accidents, wherein the retrieved accident records are proximate to the predicted upcoming geographic location;
   comparing the accidence occurrence value to the threshold;
   determining, based on the comparison, that the predicted upcoming geographic location is a high risk location; and
   notifying the driver of the high risk location.

3. The method of claim 1, wherein the current vehicle state is further based on one or more intra-vehicle factors and one or more extra-vehicle factors.

4. The method of claim 3 further comprising:
   retrieving the current driver profile corresponding to the driver of the selected vehicle, wherein the current driver profile includes an experience level of the driver, an age of the driver, any impediments of the driver, a previous accident history of the driver, and any driving restrictions of the driver;
   identifying a driver risk level based on the retrieved current driver profile; and
   adjusting the threshold based on the identified driver risk level.

5. The method of claim 3 wherein at least one of the intra-vehicle factors is selected from a group consisting of a vehicle quality factor, a vehicle performance factor, a current driving style factor, a current distraction factor, a current mobile phone usage factor, a current electronic device usage factor, a current noise volume factor, a current passenger activity level factor, a current conversation level factor, and a current driver profile factor.

6. The method of claim 3 wherein at least one of the extra-vehicle factors is selected from a group consisting of a time of day factor, a day of week factor, a day of year factor, a traffic congestion factor, a traffic relative positions factor, a traffic throughput factor, a traffic average speed factor, a road construction factor, an external vehicles anomalies factor, a weather factor, a sunlight intensity factor, a darkness factor, a sun position factor, and a sun orientation factor.

7. The method of claim 1 further comprising:
   sending a second notification to a non-driver, wherein the second notification informs the non-driver of the detected accident risk.

8. An information handling system comprising:
   one or more processors;
   a memory coupled to at least one of the processors;
   a network adapter that connects the information handling system to a computer network; and
   a set of instructions stored in the memory and executed by at least one of the processors to determining vehicle accident risk, wherein the set of instructions perform actions of:
      during operation of a selected vehicle, determining a current vehicle state of the selected vehicle, wherein the current vehicle state is based on a predicted upcoming geographic location of the selected vehicle;
      comparing the current vehicle state to a plurality of historic accident-related vehicle states that correspond to a plurality of vehicle accidents previously recorded for a plurality of vehicles;
      detecting an accident risk pertaining to the selected vehicle based on the comparison;
      determining whether the detected accident risk reaches a threshold, wherein the threshold is based on a current driver profile corresponding to a driver of the selected vehicle; and notifying the driver of the selected vehicle of the detected accident risk based upon the determination.

9. The information handling system of claim 8 wherein the actions further comprise:
   identifying the predicted upcoming geographic location of the selected vehicle based on a current speed and a current direction of the selected vehicle;
   identifying an accident occurrence value pertaining to the identified predicted upcoming geographic location by retrieving one or more accident records from the plurality of vehicle accidents, wherein the retrieved accident records are proximate to the predicted upcoming geographic location;
   comparing the accidence occurrence value to the threshold;
   determining, based on the comparison, that the predicted upcoming geographic location is a high risk location; and
   notifying the driver of the high risk location.

10. The information handling system of claim 8, wherein the current vehicle state is further based on one or more intra-vehicle factors and one or more extra-vehicle factors.

11. The information handling system of claim 10 wherein the actions further comprise:
   retrieving the current driver profile corresponding to the driver of the selected vehicle, wherein the current driver profile includes an experience level of the driver, an age of the driver, any impediments of the driver, a previous accident history of the driver, and any driving restrictions of the driver;
   identifying a driver risk level based on the retrieved current driver profile; and
   adjusting the threshold based on the identified driver risk level.

12. The information handling system of claim 10 wherein at least one of the intra-vehicle factors is selected from a group consisting of a vehicle quality factor, a vehicle performance factor, a current driving style factor, a current distraction factor, a current mobile phone usage factor, a current electronic device usage factor, a current noise volume factor, a current passenger activity level factor, a current conversation level factor, and a current driver profile factor.

13. The information handling system of claim 10 wherein at least one of the extra-vehicle factors is selected from a group consisting of a time of day factor, a day of week factor, a day of year factor, a traffic congestion factor, a traffic relative positions factor, a traffic throughput factor, a traffic average speed factor, a road construction factor, an external vehicles anomalies factor, a weather factor, a sunlight intensity factor, a darkness factor, a sun position factor, and a sun orientation factor.

14. The information handling system of claim 8 wherein the actions further comprise:
   sending a second notification to a non-driver, wherein the second notification informs the non-driver of the detected accident risk.

15. A computer program product stored in a computer readable storage medium, comprising computer instructions that, when executed by an information handling system, causes the information handling system to determining vehicle accident risk by performing actions comprising:
   during operation of a selected vehicle, determining a current vehicle state of the selected vehicle, wherein the current vehicle state is based on a predicted upcoming geographic location of the selected vehicle;
   comparing the current vehicle state to a plurality of historic accident-related vehicle states that correspond to a plurality of vehicle accidents previously recorded for a plurality of vehicles;
   detecting an accident risk pertaining to the selected vehicle based on the comparison;
   determining whether the detected accident risk reaches a threshold, wherein the threshold is based on a current driver profile corresponding to a driver of the selected vehicle; and
   notifying the driver of the selected vehicle of the detected accident risk based upon the determination.

16. The computer program product of claim 15 wherein the actions further comprise:
   identifying the predicted upcoming geographic location of the selected vehicle based on a current speed and a current direction of the selected vehicle;
   identifying an accident occurrence value pertaining to the identified predicted upcoming geographic location by retrieving one or more accident records from the plurality of vehicle accidents, wherein the retrieved accident records are proximate to the predicted upcoming geographic location;
   comparing the accidence occurrence value to the threshold;
   determining, based on the comparison, that the predicted upcoming geographic location is a high risk location; and
   notifying the driver of the high risk location.

17. The computer program product of claim 15, wherein the current vehicle state is further based on one or more intra-vehicle factors and one or more extra-vehicle factors.

18. The computer program product of claim 17 wherein the actions further comprise:
   retrieving the current driver profile corresponding to the driver of the selected vehicle, wherein the current driver profile includes an experience level of the driver, an age of the driver, any impediments of the driver, a previous accident history of the driver, and any driving restrictions of the driver;
   identifying a driver risk level based on the retrieved current driver profile; and
   adjusting the threshold based on the identified driver risk level.

19. The computer program product of claim 17 wherein at least one of the intra-vehicle factors is selected from a group consisting of a vehicle quality factor, a vehicle performance factor, a current driving style factor, a current distraction factor, a current mobile phone usage factor, a current electronic device usage factor, a current noise volume factor, a current passenger activity level factor, a current conversation level factor, and a current driver profile factor.

20. The computer program product of claim 17 wherein at least one of the extra-vehicle factors is selected from a group consisting of a time of day factor, a day of week factor, a day of year factor, a traffic congestion factor, a traffic relative positions factor, a traffic throughput factor, a traffic average speed factor, a road construction factor, an external vehicles anomalies factor, a weather factor, a sunlight intensity factor, a darkness factor, a sun position factor, and a sun orientation factor.

* * * * *